United States Patent [19]

Ono et al.

[11] Patent Number: 4,529,692
[45] Date of Patent: Jul. 16, 1985

[54] COLOR PHOTOGRAPHIC MATERIALS WITH CHELATABLE AZO DYES

[75] Inventors: Shigetoshi Ono; Genichi Furusawa, both of Kanagawa, Japan

[73] Assignee: Fuji Photo Film Co., Ltd., Kanagawa, Japan

[21] Appl. No.: 587,436

[22] Filed: Mar. 8, 1984

[30] Foreign Application Priority Data

Mar. 8, 1983 [JP]  Japan .................................. 58-37903

[51] Int. Cl.³ .......................... G03C 1/40; G03C 5/54
[52] U.S. Cl. ..................................... 430/562; 430/223
[58] Field of Search ................................ 430/223, 562

[56] References Cited

U.S. PATENT DOCUMENTS

| | | | |
|---|---|---|---|
| 3,954,476 | 5/1976 | Krutak et al. | 430/223 |
| 4,142,891 | 3/1979 | Baigrie et al. | 430/223 |
| 4,247,629 | 1/1981 | Kanbe et al. | 430/223 |
| 4,250,246 | 2/1981 | Itoh et al. | 430/223 |
| 4,256,831 | 3/1981 | Kanbe et al. | 430/223 |
| 4,268,624 | 5/1981 | Fujita et al. | 430/223 |
| 4,273,708 | 6/1981 | Kilminister et al. | 430/223 |

*Primary Examiner*—Richard L. Schilling

*Attorney, Agent, or Firm*—Sughrue, Mion, Zinn, Macpeak, and Seas

[57] ABSTRACT

A color photographic material is disclosed. The material is comprised of a support base having thereon a photosensitive silver halide emulsion layer and a compound associated with the emulsion layer, the compound being represented by general formula (I)

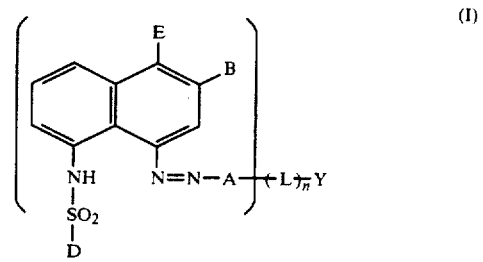

wherein the substituents are defined in the specification. The dye image-forming compounds forming metal chelates have good absorption when the dye forms a color image. Further, these compounds have a large molecular absorption coefficient and are substantially stable with respect to light after forming a color image.

20 Claims, No Drawings

COLOR PHOTOGRAPHIC MATERIALS WITH CHELATABLE AZO DYES

FIELD OF THE INVENTION

This invention relates to a color photographic material and, more particularly, to a silver halide photographic material for a color diffusion transfer process containing image-forming materials each releasing a novel azo dye capable of forming metal chelate compounds (metal complexes). The azo dyes released in this invention can form a color image composed of highly stable metal complexes in an image-receiving layer.

BACKGROUND OF THE INVENTION

Azo dye developing agents having a group capable of forming a metal complex are described in, for example, U.S. Pat. Nos. 3,081,167, 3,196,014, 3,299,041, 3,453,107 and 3,563,739.

However, since the developing component of such azo dye developing agent has a reactivity, it sometimes occurs that the developing component does not develop a silver halide which it associated with the azo dye developing agent and which should be developed thereby, but develops a silver halide in another emulsion layer which must not be developed by the developing component. This results in an undesirable multilayer effect (inter image effect). Accordingly, it is preferred that a dye not having such developing component being reactive to silver halide is transferred onto an image-receiving layer.

Furthermore, a dye image-forming compound releasing an azo dye showing excellent light resistance by forming a chelate in a metal ion-containing image-receiving layer with the dye imagewise transferred therein from a light-sensitive element is preferred.

Dye image-forming compounds having such a property are described in U.S. Pat. Nos. 4,142,891, 4,147,544, 4,149,641, 4,148,642, 4,148,643, etc.

However, in these conventional compounds the chelating speed of the released diffusible dye is insufficient and hence the discovery of dyes showing a high chelating speed has been desired.

That is, if such a dye is discovered, a photographer can view more rapidly the transferred color image having normal colors (i.e., good color reproducibility) in instant photography, thus increasing the desirability of instant photography. Also, in addition to the improvement of the chelating speed of the diffusible dye, it has been desired that the dye does not reduce the following factors as compared to conventional compounds.

(1) The chelated dye has a good absorption when the dye forms a color image.

(2) The chelated dye has a large molecular absorption coefficient.

(3) The chelated dye is sufficiently stable to light.

SUMMARY OF THE INVENTION

A primary object of this invention is, therefore, to provide a color photographic material containing dye image-forming compounds forming metal chelates meeting the foregoing factors.

The foregoing object of this invention can be effectively achieved by the color photographic material of this invention.

That is, the invention is a color photographic material comprising a support having thereon at least one photosensitive silver halide emulsion layer, at least one of the silver halide emulsions being associated with an azo dye image-forming compound represented by general formula (I):

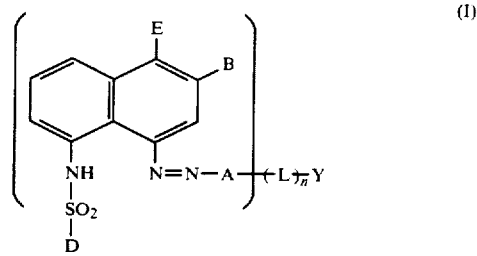

wherein A represents an aromatic carbon ring nucleus or a heterocyclic ring nucleus, at least one ring of which is composed of 5 or 6 atoms; B represents a hydrogen atom, a sulfo group, a cyano group, a fluorosulfonyl group, a halogen atom, an —$SO_3$-phenyl group, an —$SO_3$-substituted phenyl group, a carboxy group, an —$SOR^1$ group (wherein $R^1$ represents an alkyl group or a substituted alkyl group), an —$SO_2R^2$ group (wherein $R^2$ represents an alkyl group, a substituted alkyl group, an aralkyl group, a substituted aralkyl group, a phenyl group, or a substituted phenyl group), a —$COR^2$ group (wherein $R^2$ has the same significance as above), an

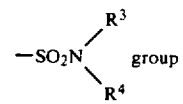

(wherein $R^3$ and $R^4$, which may be the same or different, each represents a hydrogen atom, an alkyl group, a substituted alkyl group, an aralkyl group, a substituted aralkyl group, a phenyl group, or a substituted phenyl group), or a

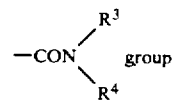

(wherein $R^3$ and $R^4$ have the same significance as defined above); D represents an alkyl group, a substituted alkyl group, an aralkyl group, a substituted aralkyl group, a phenyl group, a substituted phenyl group, an amino group (the amino group may be substituted by an alkyl group), or a heterocyclic ring composed of 5 or 6 atoms; E represents a hydroxy group, a salt thereof, or a precursor forming a hydroxy group or a salt thereof; L represents a group of combining D, A or B with Y; n represents 1 or 0; and Y represents a moiety having a function of decomposing as the result of a redox reaction by development in an alkaline state or by heating to release a diffusible azo dye compound or a precursor thereof from the compound of foregoing general formula (I).

DETAILED DESCRIPTION OF THE INVENTION

The dye moiety or precursor thereof in the compound shown by general formula (I) is imagewise released from a light-sensitive element during photographic processing and is brought into contact with a metal ion in an image-receiving layer containing the metal ion or in a layer on the way to the image-receiving layer. This forms the chelated azo dye thus forming a transfer image of the chelated azo dye meeting the foregoing factors in the image-receiving layer. The azo dye or a precursor thereof released from the light-sensitive element forms a tridentate or quadridentate chelate compound with the metal ion coordinating with the sulfonamido group at the 5-position and the azo group at the 4-position of the naphthol compound and A having a unidentate or bidentate chelate-forming group (it may be in a ring of A).

A in general formula (I) preferably represents an aromatic carbon ring nucleus or a heterocyclic ring nucleus at least one ring of which is composed of 5 or 6 atoms shown by the following general formulae (II) to (V). These ring nuclei have a unidentate or bidentate chelating group (including a coordination atom in the heterocyclic ring).

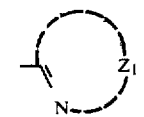
(II)

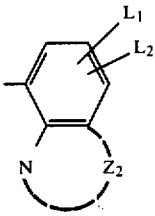
(III)

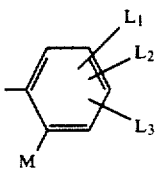
(IV)

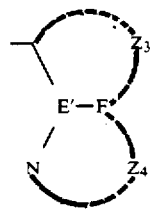
(V)

wherein $Z_1$ represents a non-metallic atomic group necessary for forming a nitrogen-containing heterocyclic ring having, preferably a 5- or 6-membered nucleus. The 5- or 6-membered nucleus may further be condensed with a ring (e.g., an unsaturated carbon ring or a heterocyclic ring). Hetero atoms other than the nitrogen atom in the nitrogen-containing heterocyclic ring include an oxygen atom and a sulfur atom.

Examples of the nitrogen-containing heterocyclic ring formed by $Z_1$ are those induced from pyrrole, imidazole, benzimidazole, pyrazole, triazole, thiazole, isothiazole, oxazole, isooxazole, pyridine, pyrazine, pyrimidine, pyridazine, isoindole, indole, indazole, purine, isoquinoline, quinoline, phthalazine, naphthyridine, quinoxaline, quinazoline, cinnoline, pteridine, β-carboline, pyrazolotriazole, thiodiazole, benzothiazole, imidazopyridine, benzimidazole, indoline, pyrazolooxazole, imidazothiazole, imidazotriazine, etc.

In the foregoing formulae, $Z_2$ represents a non-metallic atomic group necessary for forming a nitrogen-containing 5- or 6-membered heterocyclic ring condensed to a benzene ring. Practical examples of the heterocyclic ring condensed to the benzene ring include an indole, indazole, quinoxaline, quinazoline, benzoxazole, benzothiazole, benzotriazole, benzimidazole, indoline, benzothiadiazole, etc.

The heterocyclic rings formed by the foregoing $Z_1$ or $Z_2$ and $Z_3$ or $Z_4$ described hereinafter may be unsubstituted ones or may be substituted by 1 to 3 substituents, which may be the same or different, such as an amino group (which may be substituted by an alkyl group), an alkyl group (having, preferably, 1 to 3 carbon atoms), a substituted alkyl group (said alkyl group having, preferably, 1 to 3 carbon atoms and examples of the substituent include an alkoxy group having 1 to 3 carbon atoms, a hydroxy group, a cyano group, a halogen atom, etc.), an alkoxy group (having, preferably, 1 to 3 carbon atoms), $-OCH_2CH_2OCH_3$ group, a group shown by $-NHSO_2R^5$ (wherein $R^5$ represents an alkyl group having 1 to 3 carbon atoms, a phenyl group, or a tolyl group), a group shown by $-NHCOR^6$ (wherein $R^6$ represents an alkyl group having 1 to 3 carbon atoms or a phenyl group), a group shown by

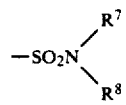

wherein $R^7$ and $R^8$, which may be the same or different, each represents a hydrogen atom or an alkyl group having 1 to 4 carbon atoms), a group shown by

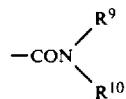

(wherein $R^9$ and $R^{10}$, which may be the same or different, each represents a hydrogen atom or an alkyl group having 1 to 3 carbon atoms), a carboxy group, an alkoxycarbonyl group, a halogen atom, a nitro group, a cyano group, etc.

$L_1$, $L_2$ and $L_3$ in the foregoing general formulae (III) and (IV), which may be the same or different, each represents a hydrogen atom, a halogen atom, a nitro group, a cyano group, an alkyl group (having, preferably, 1 to 4 carbon atoms), a substituted alkyl group (said alkyl group having, preferably, 1 to 4 carbon atoms), an alkoxy group (having, preferably, 1 to 4 carbon atoms), a substituted alkoxy group (said alkoxy group having, preferably, 1 to 4 carbon atoms), a group shown by $-NHCOR^2$ (wherein $R^2$ has the same significance as defined above), a group shown by $-NHSO_2R^2$ (wherein $R^2$ has the same significance as defined above), a group shown by $-SO_2R^2$ (wherein $R^2$ has the same significance as defined above), a group shown by $-COR^2$ (wherein $R^2$ has the same significance as defined above), a group shown by

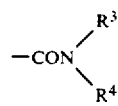

(wherein $R^3$ and $R^4$ have the same significance), a group shown by

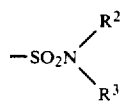

(wherein $R^2$ and $R^3$ have the same significance as defined above), an amino group (the amino group may be substituted by an alkyl group(s), or a substituted alkyl group(s), said alkyl groups may combine with each other to form a nitrogen-containing heterocyclic ring or may combine through a hetero atom to form a nitrogen-containing heterocyclic ring), etc.

Also, M of the foregoing general formula (IV) represents a unidentate or bidentate coordination chelating group, a salt thereof, or a precursor capable of giving the chelating group by decomposing under an alkaline condition.

Practical examples of M are a hydroxy group, an amino group (which may be substituted by an alkyl group), a sulfonamido group, a carboxymethoxy group, a group shown by —$OCOR^2$ (wherein $R^2$ has the same significance as defined above), a group shown by —O—$COOR^2$ (wherein $R^2$ has the same significance as defined above), or a group shown by

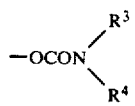

(wherein $R^3$ and $R^4$ have the same significance as defined above).

E' and F of the foregoing general formula (V), which may be the same or different, each represents a carbon atom or a nitrogen atom; $Z^3$ represents a non-metallic atomic group necessary for forming a 5- or 6-membered nitrogen-containing heterocyclic ring formed together with E', F and carbon atom adjacent to the azo group; and $Z_4$ represents a non-metallic atomic group necessary for forming a 5- or 6-membered nitrogen-containing hererocyclic ring formed together with E', F and nitrogen.

Practical examples of the condensed heterocyclic ring composed of E', F, $Z_3$, $Z_4$, etc., are imidazopyridine, pyrazolotriazole, purine, pyrazolooxazole, pyrazinopyridazine, imidazotriazine, etc.

Examples of the substituent of the —$SO_3$— substituted phenyl group shown by B of general formula (I) are a hydroxy group, a chlorine atom, a carboxy group, a group shown by

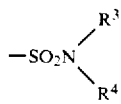

(wherein $R^3$ and $R^4$ have the same significance as defined above), a methyl group, and a methoxy group.

When B of general formula (I) is —$SOR^1$, the alkyl moiety or the alkylene moiety in the alkyl group and the substituted alkyl group shown by $R^1$ may be a straight chain or branched chain having 1 to 6 carbon atoms and examples of the substituent of the substituted alkyl group are a hydroxy group, a cyano group, an alkoxy group having about 1 to 4 carbon atoms, a halogen atom, a carboxy group, etc.

On the other hand, the alkyl moiety or the alkylene moiety in the alkyl group and the substituted alkyl group shown by $R^2$, $R^3$, $R^4$ and D may be a straight chain or branched one having, preferably, 1 to 6 carbon atoms. Also, the aralkyl group of $R^2$, $R^3$, $R^4$ and D has, preferably, 7 to 9 carbon atoms and the substituted aralkyl group has, preferably, 7 to 10 carbon atoms.

Also, examples of the substituent of the substituted alkyl group, the substituted alkoxy group, the substituted phenyl group, and the substituted aralky group shown by $R^2$, $R^3$, $R^4$, D, $L_1$, $L_2$ or $L_3$ are carboxy group, an alkoxycarbonyl group, a hydroxy group, a nitro group, an alkoxy group having 1 to about 4 carbon atoms, a group shown by —$NHSO_2R^2$ (wherein $R^2$ has the same significance as defined above), a group shown by —$NHCOR^2$ (wherein $R^2$ has the same significance as defined above), a group shown by

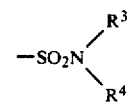

(wherein $R^3$ and $R^4$ have the same significance as defined above), a group shown by

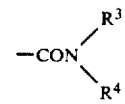

(wherein $R^3$ and $R^4$ have the same significance as defined above), a group shown by —$SO_2R^2$ (wherein $R^2$ has the same significance as defined above), a group shown by —$COR^2$ (wherein $R^2$ has the same significance as defined above), a halogen atom, a cyano group, an amino group (which may be substituted by an alkyl group), etc. Also, examples of the substituent of the foregoing substituted phenyl group and the substituted aralkyl group further include an alkyl group having 1 to 3 carbon atoms. Also, examples of the heterocyclic ring shown by D are thiophene, thiazole, isothiazole, etc.

Practical examples of the precursor of hydroxy group shown by E of general formula (I) are —$OCOR^2$ (wherein $R^2$ has the same significance as defined above), —O—$COOR^2$ (wherein $R^2$ has the same significance as defined above),

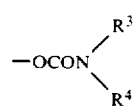

(wherein $R^3$ and $R^4$ have the same significance as defined above), or —$COOR^2$ (wherein $R^2$ has the same significance as defined above).

The bonding group shown by L of general formula (I) is practically shown by —J—X— and examples of J are —CO—, —SO$_2$—,

(wherein R$^3$ has the same significance as defined above),

(wherein R$^3$ has the same significance as defined above),

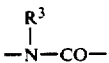

(wherein R$^3$ has the same significance as defined above),

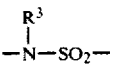

(wherein R$^3$ has the same significance as defined above),

(wherein R$^3$ has the same significance as defined above and R$^{11}$ is an alkylene group having 1 to about 4 carbon atoms),

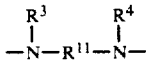

(wherein R$^3$, R$^4$ and R$^{11}$ have the same significance as defined above),

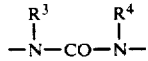

(wherein R$^3$ and R$^4$ have the same significance as defined above),

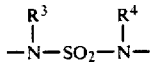

(wherein R$^3$ and R$^4$ have the same significance as defined above), etc. Also, X represents an alkylene group, a substituted alkylene group, an arylene group, a substituted arylene group, an aralkylene group, or a substituted aralkylene group.

The alkylene group and the substituted alkylene group shown by X have, preferably, 1 to about 6 carbon atoms and examples of the substituent thereof are an alkoxy group having 1 to about 3 carbon atoms, a hydroxy group, a halogen atom, etc.

Also, the arylene group and the substituted arylene group shown by X have, preferably, 6 to about 10 carbon atoms and examples of the substituent thereof are an alkyl group having 1 to about 4 carbon atoms, an alkoxy group having 1 to about 3 carbon atoms, an alkoxyalkoxy group having 3 to 5 carbon atoms, a hydroxy group, a halogen atom, a group shown by —NHSO$_2$R$^2$ (wherein R$^2$ has the same significance as defined above), a group shown by —NHCOR$^2$ (wherein R$^2$ has the same significance as defined above), a group shown by

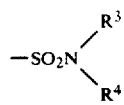

(wherein R$^3$ and R$^4$ have the same significance as defined above), a group shown by

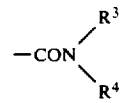

(wherein R$^3$ and R$^4$ have the same significance as defined above), a cyano group, —SO$_2$R$^2$ (wherein R$^2$ has the same significance as defined above), —COR$^2$ (wherein R$^2$ has the same significance as defined above), an amino group (the amino group may be substituted by an alkyl group(s) or a substituted alkyl group(s), said alkyl groups may combine with each other to form a nitrogen-containing heterocyclic ring or may combine through a nitrogen or other hetero atom to form a nitrogen-containing heterocyclic ring), etc.

Also, the aralkylene group or the substituted aralkylene group shown by X have, preferably, 7 to about 11 carbon atoms and examples of the substituent are an alkyl group having 1 to about 3 carbon atoms, an alkoxy group having 1 to about 3 carbon atoms, a halogen atom, a hydroxy group, etc.

Also, n of general formula (I) is 1 or 0.

Preferred embodiments of compounds of general formula (I) are shown below:

When A of formula (I) is general formula (II):

The examples of the heterocyclic ring composed of Z$_1$ and the nitrogen atom in general formula (II) are pyridine, benzothiazole, thiazole, indazole, pyrazolotriazole, benzimidazole, imidazole, thiodiazole, pyrazole and triazole.

When A is general formula (III):

Examples of the condensed heterocyclic ring formed by Z$_2$, the nitrogen atom, and the benzene ring in general formula (III) include benzotriazole, indazole, benzothiadiazole, benzimidazole, indoline and indole.

In this case, however, the heterocyclic ring formed by Z$_1$ or Z$_2$ may be unsubstituted or substituted by 1 to about 3 substituents.

When A is general formula (IV):

Examples of M of general formula (IV) are a hydroxy group or a salt thereof, a precursor of a hydroxy group (i.e., a group forming a hydroxy group by the decomposition thereof) and a sulfonamido group.

When A is general formula (V):

Examples of the condensed heterocyclic ring formed by E', F, Z$_3$, Z$_4$, etc., of general formula (V) are imidazopyridine, pyrazolotriazole, imidazotriazine.

In this case, these heterocyclic rings may be unsubstituted or substituted by 1 to about 3 substituents.

Examples of B of general formula (I) are a hydrogen atom, a cyano group, a halogen atom, an —SO$_2$R$^2$ group (wherein R$^2$ represents an alkyl group having 1 to 3 carbon atoms, a benzyl group, or a phenyl group), a group shown by

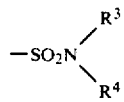

[wherein R$^3$ and R$^4$, which may be the same or different, each represents a hydrogen atom, an alkyl group having 1 to 4 carbon atoms, a substituted alkyl group having 1 to 4 carbon atoms (examples of the substituent are an alkoxy group having 1 to 3 carbon atoms, a hydroxy group, a cyano group, a halogen atom, an alkoxycarbonyl group, and a carboxy group), a phenyl group, a substituted phenyl group (examples of the substituent are a methoxy group, an ethoxy group, a methoxyethoxy group, a morpholino group, a methyl group, a cyano group, an alkoxycarbonyl group, a carboxy group, a halogen atom, a sulfonamide group and a sulfamoyl group)], or a group shown by

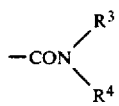

(wherein R$^3$ and R$^4$ have the same significance as defined above).

Furthermore, D of general formula (I) represents an alkyl group having 1 to 4 carbon atoms, a substituted alkyl group having 1 to 4 carbon atoms [wherein examples of the substituent are an alkoxy group, a halogen atom, a cyano group, an amino group (said amino group may be substituted by an alkyl group), a hydroxy group, etc.], a phenyl group, a substituted phenyl group (examples of the substituent are an alkyl group having 1 to 3 carbon atoms, an alkoxy group having 1 to 3 carbon atoms, a methoxyethoxy group, an ethoxyethoxy group, a morpholino group, a piperidino group, etc.), or an amino group (said amino group may be substituted by an alkyl group having 1 to 3 carbon atoms).

Also, E of general formula (I) represents a hydroxy group, a salt thereof, or a precursor of a hydroxy group [i.e., a group forming a hydroxy group or a salt thereof by the decomposition thereof (hydrolysis, intramolecular cyclization reaction, etc.)].

L of general formula (I) is shown by —J—X—, wherein J represents —CO—, —SO$_2$—,

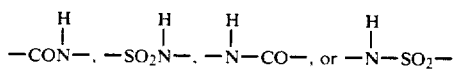

and X represents an alkylene group having 1 to 3 carbon atoms, a phenylene group, a substituted phenylene group [examples of the substituent are an alkoxy group having 1 to 3 carbon atoms, an alkoxyalkoxy group having 3 to 4 carbon atoms, an amino group (which may be substituted by an alkyl group(s)), and a morpholino group].

Also, n of general formula (I) is 0 or 1.

Furthermore, particularly preferred examples of the compound shown by general formula (I) are shown below:

When A of general formula (I) is general formula (II):

Examples of the heterocyclic ring composed of Z$_1$ and the nitrogen atom of general formula (II) are pyridine, thiazole, benzothiazole, pyrazolotriazole, indazole, imidazole, pyrazole, and triazole.

When A is general formula (III):

Examples of the condensed heterocyclic ring formed by Z$_2$, the nitrogen atom, and the benzene ring of general formula (III) are benzotriazole, indazole, and benzimidazole.

In this case, the heterocyclic ring formed by Z$_1$ may be unsubstituted or substituted by 1 to about 3 substituents. The substituents, which may be the same or different when two or more such substituents are used, each represents a methyl group, an ethyl group, a methoxy group, an ethoxy group, a methoxyethoxy group, a group shown by —NHSO$_2$R$^5$ (wherein R$^5$ represents a methyl group, an ethyl group, or a phenyl group), a group shown by —NHCOR$^6$ (wherein R$^6$ represents a methyl group, an ethyl group, or a phenyl group), a group shown by

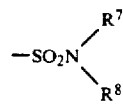

(wherein R$^7$ and R$^8$, which may be the same or different, each represents a hydrogen atom or an alkyl group having 1 to 4 carbon atoms), a group shown by

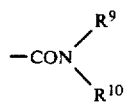

(wherein R$^9$ and R$^{10}$, which may be the same or different, each represents a hydrogen atom, a methyl group, an ethyl group, an n-propyl group or an isopropyl group), a carboxy group, or an ethoxycarboxy group.

Also, the heterocyclic ring formed by Z$_2$ may be unsubstituted or substituted by a methyl group, an ethyl group, or a methoxy group.

The groups shown by L$_1$ and L$_2$ of general formula (III) may be the same or different and they represent a hydrogen atom, a morpholino group, a pyrrolidino group, a diethylamino group, a nitro group, a methyl group, a methoxy group, an —OCH$_2$CH$_2$OCH$_3$ group, an —NHSO$_2$CH$_3$ group, an —NHCOCH$_3$ group, an —SO$_2$CH$_3$ group, an —SO$_2$NH$_2$ group, an

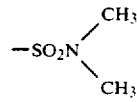

group, or a halogen atom.

When A is general formula (IV):

M of general formula (IV) represents a hydroxy group, a salt thereof, —NHSO$_2$CH$_3$, or

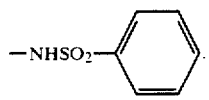

The groups shown by $L_1$, $L_2$ and $L_3$ of general formula (IV) may be the same or different and they represent a hydrogen atom, a morpholino group, a pyrrolidino group, a diethylamino group, a nitro group, a methyl group, a methoxy group, an —OCH$_2$CH$_2$OCH$_3$ group, an —NHSO$_2$CH$_3$ group, an —NHCOCH$_3$ group, an —SO$_2$CH$_3$ group, an —SO$_2$NH$_2$ group, an

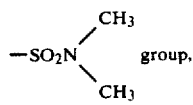

or a halogen atom.

When A is general formula (V):

Examples of the condensed heterocyclic ring formed by E', F, $Z_3$, $Z_4$, etc., of general formula (V) are imidazopyridine and pyrazolotriazole. In this case, the heterocyclic ring may be unsubstituted or substituted by a methyl group, an ethyl group or a methoxy group.

B of general formula (I) represents a hydrogen atom, a cyano group, a chlorine atom, an —SO$_2$CH$_3$ group, a group shown by

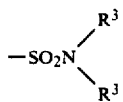

[wherein $R^3$ and $R^4$, which may be the same or different, each represents a hydrogen atom, an alkyl group having 1 to 4 carbon atoms, a —CH$_2$CH$_2$OCH$_3$ group, a —CH$_2$CH$_2$OH group, a phenyl group, a substituted phenyl group (examples of the substituent are a methyl group, a methoxyethoxy group, a morpholino group, a sufonamide group, a sulfamoyl group and a carboxy group)] or a group shown by

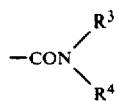

(wherein $R^3$ and $R^4$ have the same significance as defined above).

D of general formula (I) represents a methyl group, an amino group (which may be substituted by a methyl group or an ethyl group), a phenyl group or a substituted phenyl group (examples of the substituent are a methyl group, a methoxyethoxy group and a morpholino group).

E of general formula (I) represents a hydroxy group or a salt thereof.

L of general formula (I) is a group shown by —J—X— combining D or A with Y, wherein J represents —CO—, —SO$_2$—,

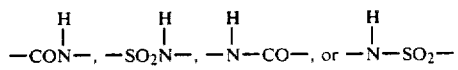

and X represents a phenylene group or a substituted phenylene group (examples of the substituent are a methyl group, a methoxy group, an ethoxy group, a methoxyethoxy group and a morpholino group).

Also, n of general formula (I) is 1 or 0.

As the compound of general formula (I), there is a non-diffusible image-forming compound (DRR compound) which is oxidized as the result of development to provide a diffusible dye by causing self cleavage.

As the effective group shown by Y of general formula (I), there is a group shown by the following formula (A):

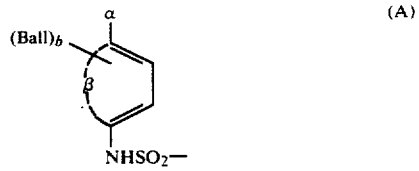

wherein $\beta$ represents a non-metallic atomic group necessary for forming a benzene ring and said benzene ring may be condensed with a carbon ring or a heterocyclic ring to form, for example, a naphthalene ring, a quinoline ring, a 5,6,7,8-tetrahydronaphthalene ring, a cumarone ring, etc. Moreover, the foregoing benzene ring or the ring formed by the condensation of the benzene ring with a carbon ring or a heterocyclic ring may have a substituent such as a halogen atom, an alkyl group, an alkoxy group, an aryl group, an aryloxy group, a nitro group, an amino group, an alkylamino group, an arylamino group, an amido group, a cyano group, an alkylmercapto group, a keto group, a carboalkoxy group, a heterocyclic group, etc.

$\alpha$ of formula (A) represents a group shown by —OG$^1$ or —NHG$^2$. G$^1$ represents a hydrogen atom; or a group forming a hydroxy group by causing decomposition thereof (e.g., hydrolysis) and preferably a group shown by

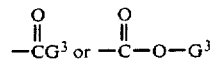

[wherein G$^3$ represents an alkyl group, in particular, an alkyl group having 1 to 18 carbon atoms (e.g., a methyl group, an ethyl group, a propyl group, etc.), a halogen-substituted alkyl group having 1 to 18 carbon atoms (e.g., a chloromethyl group, a trifluoromethyl group, etc.), a phenyl group, or a substituted phenyl group]. G$^2$ represents a hydrogen atom; an alkyl group having 1 to 22 carbon atoms; or a group capable of decomposing by hydrolysis, and preferably a group shown by

—SO$_2$G$^5$, or —SOG$^5$ (wherein G$^4$ represents an alkyl group having 1 to 4 carbon atoms, such as a methyl group, etc.; a halogen-substituted alkyl group such as a mono-, di- or trichloromethyl group and mono-, di- or trifluoromethyl group; an alkylcarbonyl group such as an acetyl group, etc.; an alkyloxy group; a substituted phenyl group such as a nitrophenyl group, a cyanophenyl group, etc.; an unsubstituted phenyloxy group or a phenyloxy group substituted by a lower alkyl group or a halogen atom; a carboxy group; an alkyloxycarbonyl group; an aryloxycarbonyl group; an alkylsulfonylethoxy group; or an arylsulfonylethoxy group and $G^5$ represents a substituted or unsubstituted alkyl group or a substituted or unsubstituted aryl group).

Furthermore, b is an integer of 0.1 or 2. However, when α is a group shown by —OG¹ and when α is shown by —NHG² and G² is a hydrogen atom, an alkyl group having 1 to 8 carbon atoms, or a decomposable group, b is 1 or 2, preferably 1. Also, Ball in formula (A) is a ballast group, which will be described in detail hereinafter.

Practical examples of this kind of Y are described in U.S. Pat. Nos. 3,928,312, 4,135,929, and Japanese Patent Application (OPI) No. 50736/78 (the term "OPI" indicates an unexamined published patent application open to public inspection).

Other suitable example of Y effective for the compound of general formula (I) is a group shown by the following formula (B):

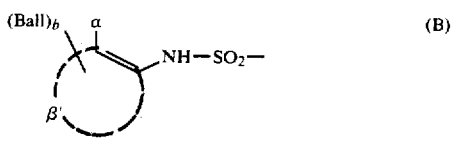

wherein Ball, α and b have the same significance as defined in the case of formula (A); β represents an atomic group necessary for forming a carbon ring such as a benzene ring and said benzene ring may further be condensed with a carbon ring or a heterocyclic ring to form a naphthalene ring, a quinoline ring, a 5,6,7,8-tetrahydronaphthalene ring, a cumarone ring, etc. Moreover, the foregoing rings may have a substituent such as a halogen atom, an alkyl group, an alkoxy group, an aryl group, an aryloxy group, a nitro group, an amino group, an alkylamino group, an arylamino group, an amido group, a cyano group, an alkylmercapto group, a keto group, a carboalkoxy group, a heterocyclic group, etc.

Practical examples of this kind of Y are described in U.S. Pat. Nos. 4,053,312, 4,055,428 and 4,268,625, Japanese Patent Application (OPI) Nos. 12642/81, 16130/81 and 16131/81.

Still further, a group shown by the following general formula is also effective as Y:

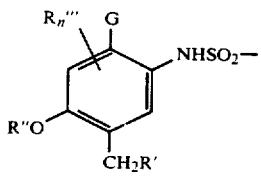

wherein G represents a hydroxy group or a group providing a hydroxy group by hydrolysis; R' represents an alkyl group or an aryl group; R'' represents an alkyl group or an aryl group; R''' represents an alkyl group, an alkoxy group, an alkylthio group, an arylthio group, a halogen atom, or an acylamino group; n represents 0, 1 or 2; said R'' and R''' may combine with each other to form a condensed ring; said R' and R'' may combine to form a condensed ring; said R' and R''' may combine to form a condensed ring; and the total carbon atom number of said R', R'' and R''' is at least 7.

Moreover, other example of suitable Y effective to the compound of general formula (I) is a group shown by formula (C):

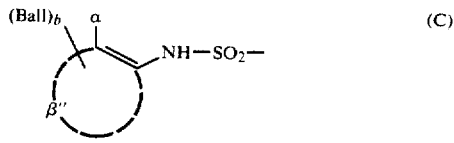

wherein Ball, α and b have the same significance as defined in the case of formula (A) and β'' represents an atomic group necessary for forming a heterocyclic group such as a pyrazole ring, a pyridine ring, etc.; said heterocyclic ring may be further condensed with a heterocyclic ring and further the foregoing rings may have a substituent as the substituents of the rings described in regard to formula (B). Practical examples of this kind of Y are described in U.S. Pat. No. 4,198,235.

Still other suitable example of Y effective to the compound of general formula (I) is a group shown by formula (D):

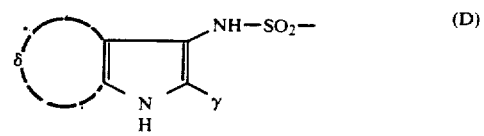

wherein γ represents a hydrogen atom, a substituted or unsubstituted alkyl group, a substituted or unsubstituted aryl group, a substituted or unsubstituted heterocyclic group, or —CO—G⁶ [wherein G⁶ represents —OG⁷, —S—G⁷, or a group shown by

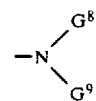

(wherein G⁷ represents a hydrogen atom, an alkyl group, a cycloalkyl group or an aryl group; said alkyl group, cycloalkyl group, and aryl group may have a substituent; G⁸ represents the same group as foregoing G⁷ or G⁸ represents an acyl group induced from an aliphatic or aromatic carboxylic acid or a sulfonic acid; and G⁹ represents a hydrogen atom or an unsubstituted or substituted alkyl group)]; and δ represents a residue necessary for completing a condensed benzene ring; said condensed benzene ring may have one or more substituents; and the substituent of the foregoing condensed benzene ring completed by said γ and/or δ is a ballast group or a group containing a ballast group. Practical examples of this kind of Y are described in Japanese Patent Application (OPI) No. 104343/76 and U.S. Pat. Nos. 4,179,291 and 4,273,855.

A further example of suitable Y effective to the compound of general formula (I) is shown by formula (E):

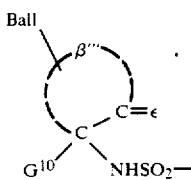

(E)

wherein Ball has the same significance as the case of formula (A); $\epsilon$ represents an oxygen atom or an $=NG''$ group (wherein G'' represents a hydroxy group, or an amino group which may have a substituent); when, in particular, $\epsilon$ is $=NG''$, typical G'' is the G'' in the group $=C=N=G''$ formed as the result of the dehydration reaction of a carbonyl reagent shown by $H_2N-G''$ and a ketone group. As the compound of $H_2N-G''$, there are hydroxyamine, hydrazines, semicarbazides, thiosemicarbazides, etc. Practical examples of the hydrazines are hydrazine; phenylhydrazine; a substituted phenylhydrazine having at the phenyl group a substituent such as an alkyl group, an alkoxy group, a carboxyalkoxy group, a halogen atom, etc.; and isonicotinic acid hydrazide. Also, practical examples of the semicarbazides are phenylsemicarbazide and a substituted phenylsemicarbazide having a substituent such as an alkyl group, an alkoxy group, a carboalkoxy group, a halogen atom, etc. Also, about the thiocarbazides, there are various derivatives as those of the semicarbazides.

Also, $\beta'''$ of foregoing formula (E) represents a 5-membered, 6-membered, or 7-membered saturated or unsaturated non-aromatic hydrocarbon ring and practical examples thereof are cyclopentanone, cyclohexanone, cyclohexenone, cyclopentenone, cycloheptanone, cycloheptenone, etc. Furthermore, the 5- to 7-membered non-aromatic hydrocarbon ring may be fused with another ring at a proper position thereof to form a condensed ring. Another ring may be an aromatic ring, a non-aromatic ring, or a heterocyclic ring but when forming a condensed ring, a condensed ring formed by fusing benzene with the foregoing 5- to 7-membered non-aromatic hydrocarbon ring, such as indanone, benzocyclohexenone, benzocycloheptenone, etc., is more preferred in this invention.

The foregoing 5- to 7-membered non-aromatic hydrocarbon rings or the foregoing condensed rings may have one or more substituents such as an alkyl group, an aryl group, an alkyloxy group, an aryloxy group, an alkylcarbonyl group, an arylcarbonyl group, an alkylsulfonyl group, an arylsulfonyl group, a halogen atom, a nitro group, an amino group, an alkylamino group, an arylamino group, an amido group, an alkylamido group, an arylamido group, a cyano group, an alkylmercapto group, an alkyloxycarbonyl group, etc.

$G^{10}$ of formula (E) represents a hydrogen atom or a halogen atom such as fluorine, chlorine, bromine, etc.

Practical examples of this kind of Y are described in U.S. Pat. No. 4,149,892.

Other examples of Y effective to the compounds of this invention shown by general formula (I) are described in, for example, U.S. Pat. Nos. 3,443,939, 3,443,940, 3,628,952, 3,844,785, 3,443,943, etc.

Another type of compound shown by general formula (I) is non-diffusible image-forming compound (DRR compound) which releases a diffusible dye by causing self ring-closure under an alkaline condition but becomes a material substantially not releasing dye when the compound is reacted with the oxidation product of a developing agent.

Examples of Y effective to this type of the compound of general formula (I) is a group shown by formula (F):

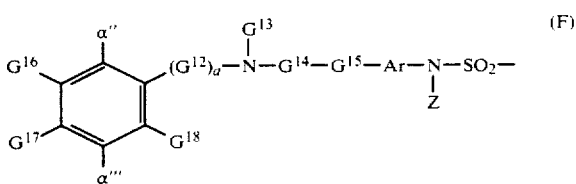

(F)

wherein $\alpha''$ is an oxidizable nucleophilic group such as a hydroxy group, a primary or secondary amino group, a hydroxyamino group, a sulfonamido group, etc., or a precursor thereof and is preferably a hydroxy group.

Also, $\alpha'''$ is a dialkylamino group or the group as defined in regard to $\alpha''$, and is preferably a hydroxy group.

$G^{14}$ of formula (F) is a nucleophilic group such as $-CO-$, $-CS-$, etc., and is, preferably, $-CO-$. $G^{15}$ is an oxygen atom, a sulfur atom, a selenium atom, a nitrogen atom, etc., and when $G^{15}$ is a nitrogen atom, it may be substituted by a hydrogen atom, an unsubstituted or substituted alkyl group having 1 to 10 carbon atoms, or an aromatic compound residue having 6 to 20 carbon atoms. Preferred $G^{15}$ is an oxygen atom. $G^{12}$ is an alkylene group having 1 to 3 carbon atoms; and a is 0 or 1, preferably 0. $G^{13}$ is a substituted or unsubstituted alkyl group having 1 to 40 carbon atoms or a substituted or unsubstituted aryl group having 6 to 40 carbon atoms and is preferably an alkyl group.

$G^{16}$, $G^{17}$ and $G^{18}$ each is a hydrogen atom, a halogen atom, a carbonyl group, a sulfamyl group, a sulfonamido group, an alkyloxy group having 1 to 40 carbon atoms, or the group as defined in regard to $G^{13}$. Said $G^{16}$ and $G^{17}$ may form together a 5- or 7-membered ring.

Also, $G^{17}$ may be

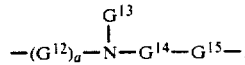

In the foregoing formula (F), at least one of said $G^{13}$, $G^{16}$, $G^{17}$ and $G^{18}$ represents a ballast group. Ar of formula (F) represents an alylene group and Z represents a hydrogen atom, an alkyl group, or a substituted alkyl group. Said Ar is, preferably, a p-, m- or o-phenylene group, which may have a substituent such as an alkyl group having 1 to 4 carbon atoms, an alkoxy group having 1 to 4 carbon atoms, an alkoxyalkoxy group having 1 to 6 carbon atoms, or a halogen atom (in particular, chlorine atom).

Practical examples of this kind of Y are described in U.S. Pat. No. 3,980,479.

The oxidation product of the group shown by formula (F), that is, the group shown by the following formula (F') can be used as Y of general formula (I) in this invention. When the group shown by formula (F') is reduced, the group of formula (F) is formed, which has a function of releasing a diffusible dye.

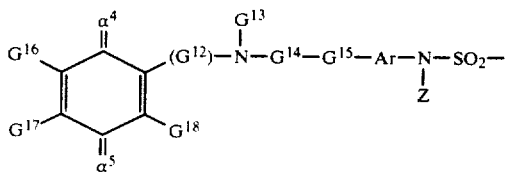

(F')

wherein $\alpha^4$ represents a group which forms $\alpha''$ when reduced; $\alpha^5$ represents a group which forms $\alpha'''$ when reduced; and other marks have the same significance as defined for formula (F).

Practical examples of this kind of Y are described in U.S. Pat. Nos. 4,139,379 and 4,278,750.

Moreover, an example of Y suitable for this type of the compound of general formula (I) is a group shown by the following formula (G):

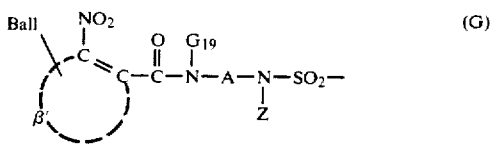

(G)

wherein Ball and $\beta'$ are the same as those of formula (B); $G^{19}$ represents an alkyl group or a substituted alkyl group; A represents a divalent group, such as an alkylene group having 1 to 6 carbon atoms or Ar (Ar is the same as that in formula (F)); and Z is the same as that in formula (F).

Practical examples of this type of Y are described in U.S. Pat. Nos. 4,183,753, 4,142,891, 4,278,750, 4,139,379 and 4,218,368.

Also, further examples of Y suitable for this type of the compound of general formula (I) is a group shown by formula (H):

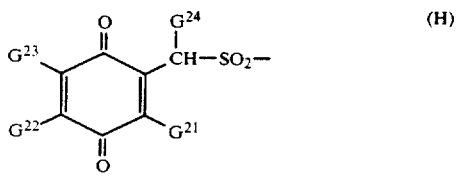

(H)

wherein $G^{21}$, $G^{22}$ and $G^{23}$ each represents a hydrogen atom, a halogen atom, an alkyl group, a substituted alkyl group, an alkoxy group, a substituted alkoxy group, an aryl group, a substituted aryl group, or an acylamino group; said $G^{22}$ and $G^{23}$ may form a condensed ring; $G^{24}$ represents a hydrogen atom, an alkyl group, or a substituted alkyl group; at least one of said $G^{21}$, $G^{22}$, $G^{23}$ and $G^{24}$ includes a ballast group.

The compounds of foregoing formula (H) include the group shown by the following formula:

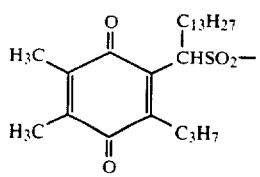

More detailed examples of the group shown by formula (H) are described in U.S. Pat. No. 4,232,107 and Japanese Patent Application (OPI) No. 119345/82.

Other examples of Y suitable for the compound of general formula (I) is a group shown by the following formula (J):

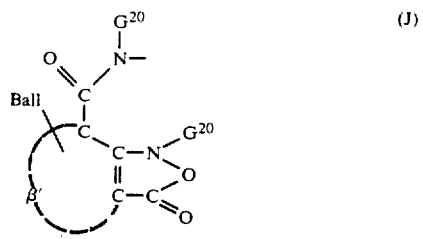

(J)

wherein Ball and $\beta'$ are the same as those in formula (B) and $G^{20}$ has the same significance as $G^{19}$ of formula (G).

Practical examples of this kind of Y are described in U.S. Pat. Nos. 4,199,354 and 4,199,355.

Another type of the compound shown by general formula (I) is an undiffusible compound (dye-releasing coupler) releasing a diffusible dye when performing a coupling reaction with the oxidation product of a color developing agent oxidized by silver halide. Typical examples of Y effective to this type of compound of general formula (I) are the groups shown in U.S. Pat. No. 3,227,550.

An example of this kind of Y is a group shown by formula (K):

$$(\text{Ball-Coup})_t\text{-Link-} \tag{K}$$

wherein Coup represents a coupler residue capable of coupling with the oxidation product of a color developing agent, auch as a 5-pyrazolone-type coupler residue, a phenol-type coupler residue, a naphthol-type coupler residue, an indanone-type coupler residue, or an open chain ketomethylene coupler residue, and Ball represents a ballast group.

Link represents a group bonded to the Coup moiety at the active point and capable of cleaving the bond between the group and the Coup moiety when the dye image-forming compound of formula (I) having the group shown by the foregoing formula (I) as Y performs a coupling reaction with the oxidation product of a color developing agent. Examples of the group shown by Link are an azo group, an azoxy group, —O—, —Hg—, an alkylidene group, —S—, —S—S— and —NHSO$_2$.

When Link is an alkylidene group, t is 1 or 2 and when Link is one of the foregoing groups other than an alkylidene group, t is 1.

In a preferred example among Ys shown by the foregoing formula (K), Coup is a phenol-type coupler residue, a naphthol-type coupler residue or an indanone-type coupler residue and Link is —NHSO$_2$—.

A particularly effective group as Y is an N-substituted sulfamoyl group. Preferred examples of the N-substituent for the N-substituted sulfamoyl group are a carbon ring group or a heterocyclic ring group. Particularly preferred examples of the N-carbon ring-substituted sulfamoyl groups are the groups shown by the foregoing formulae (A) and (B) among the abovedescribed various groups. Also, particularly preferred examples of the N-heterocyclic-substituted sulfamoyl groups are the groups shown by formulae (C) and (D) among the aforesaid groups.

The ballast group in this invention is a group bonded to the compound of this invention so that the compound of this invention can exist in the form of an indiffusible material in a hydrophilic colloid ordinarily used for photographic materials.

Since the diffusibility (or undiffusibility) of a compound is influenced by the molecular size of the compound, if the whole molecule of an objective compound is sufficiently large, the compound is imparted with a sufficient undiffusibility using a relatively short group as the ballast group.

Practical examples of the compound shown by general formula (I) are as follows:

Compound 1

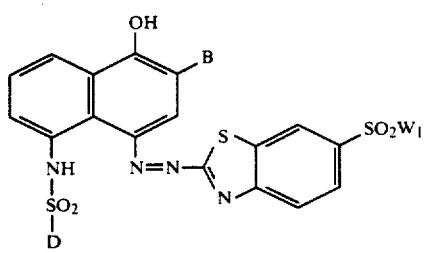

wherein B = H, D = $CH_3$, and

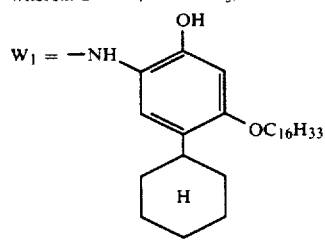

In the above formula of Compound 1, B = Cl, D = $CH_3$, and

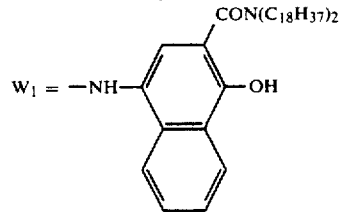

In the above formula of Compound 1,

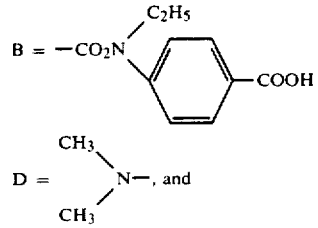

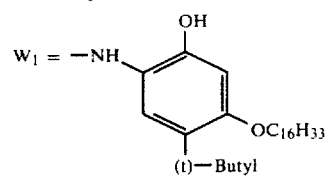

Compound 2

In the formula of Compound 1,

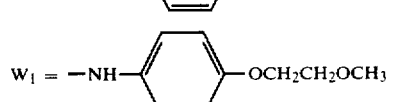
B = H, D = , and

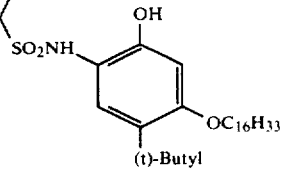

Compound 3

In the above formula of Compound 1, B = $-SO_2N(isopropyl)_2$, D = $CH_3$, and

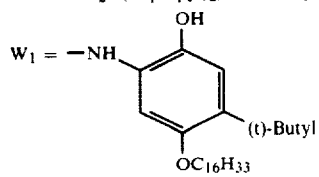

Compound 4

Compound 5

Compound 6
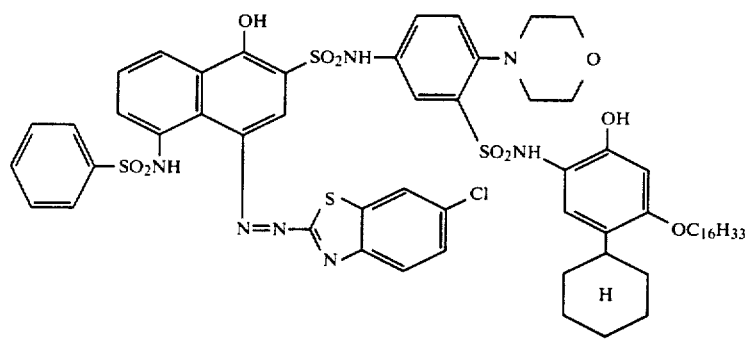
Compound 7
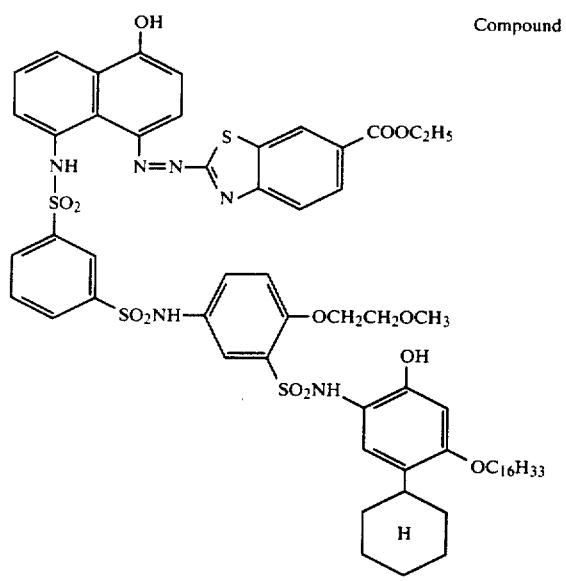
Compound 8
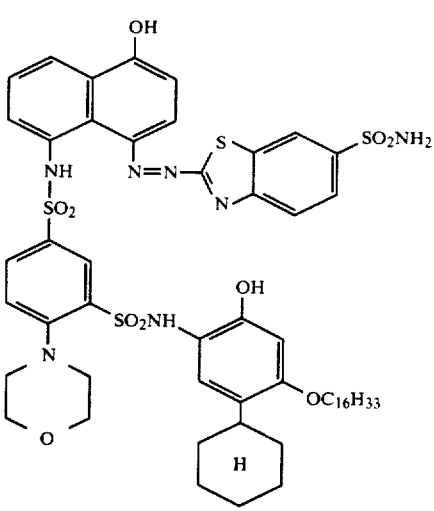
Compound 9
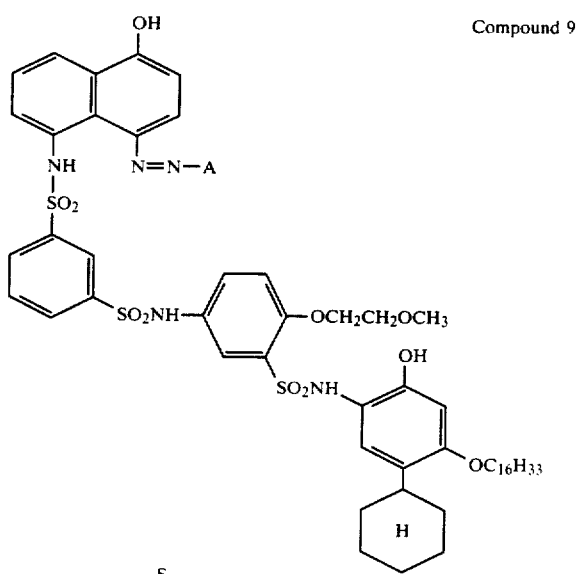
In the formula of Compound 9,
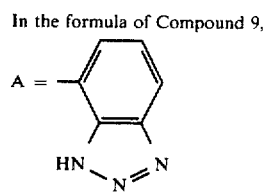
Compound 10
wherein A = 

-continued

In the above formula of Compound 9,     Compound 11

A = 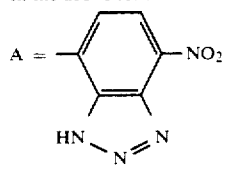

In the above formula of Compound 9,     Compound 12

A = 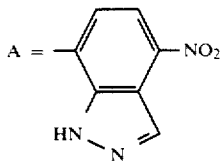

In the above formula of Compound 9,     Compound 13

A = 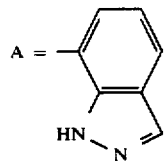

In the above formula of Compound 9,     Compound 14

A = 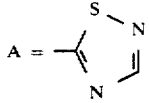

In the above formula of Compound 9,     Compound 15

A = 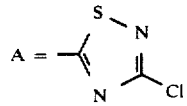

In the above formula of Compound 9,     Compound 16

A = 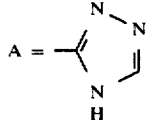

In the above formula of Compound 9,     Compound 17

A = 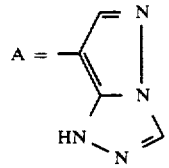

Compound 18

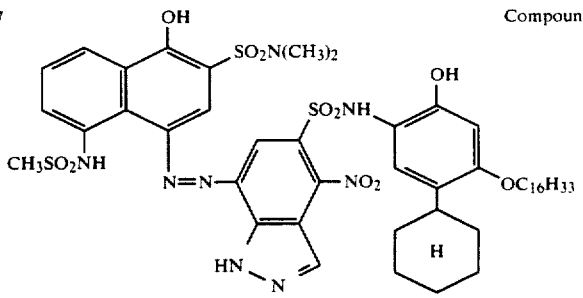

Compound 19

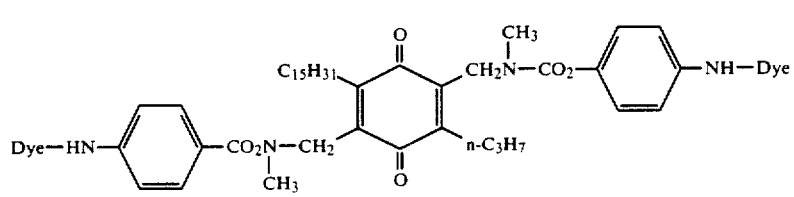

wherein Dye =

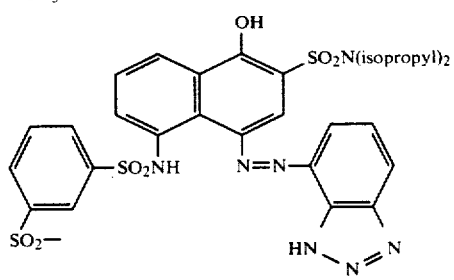

(Hereinafter, "Dye" represents the above group.)

Compound 20

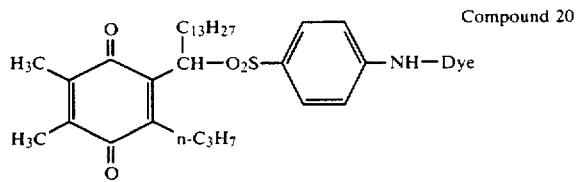

Compound 21

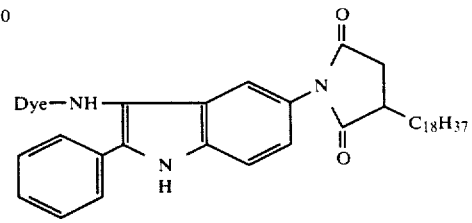

-continued
Compound 22
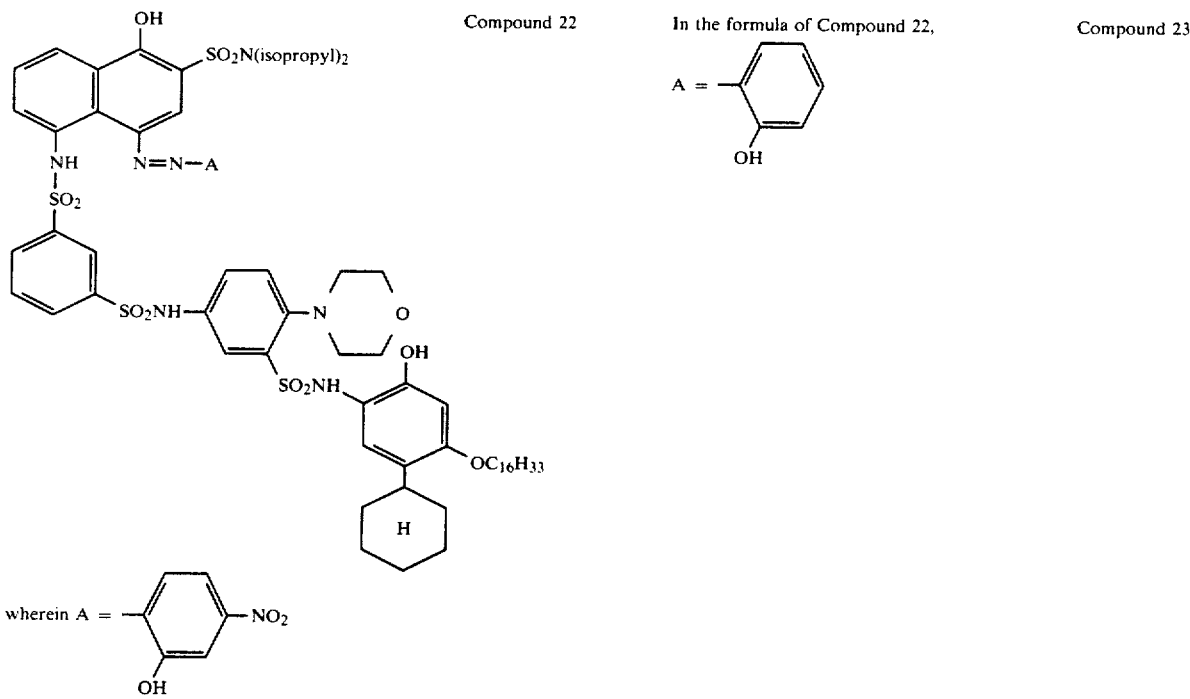
wherein A =
In the formula of Compound 22,
Compound 23
In the above formula of Compound 22,
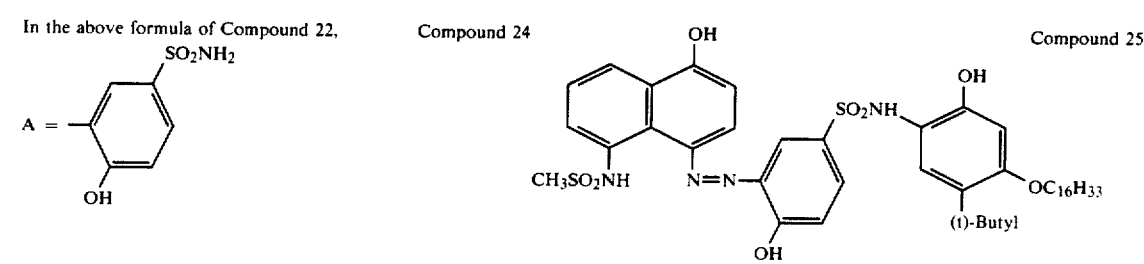
Compound 24
Compound 25
Compound 26
Compound 27
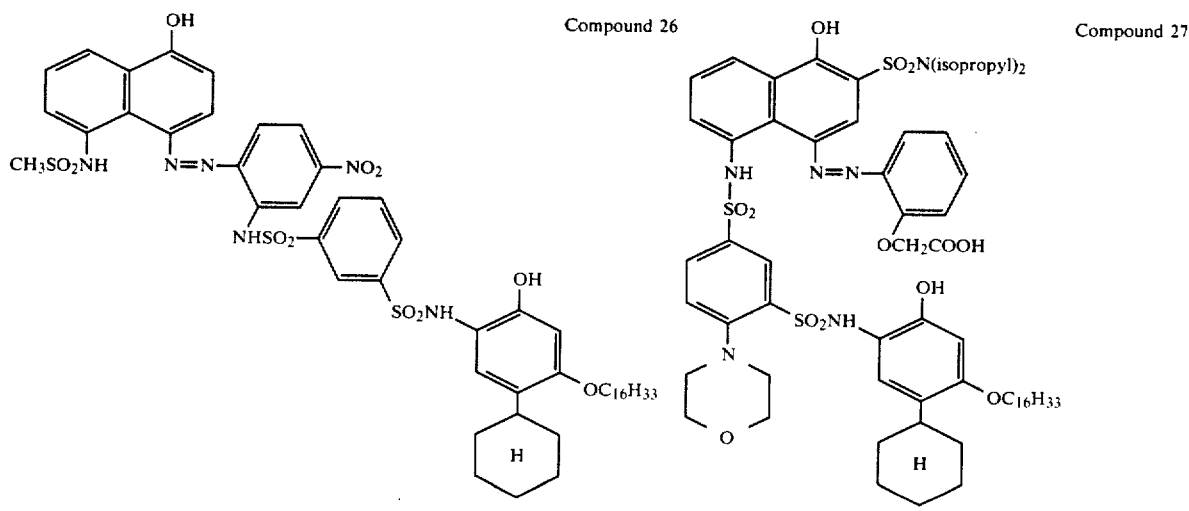

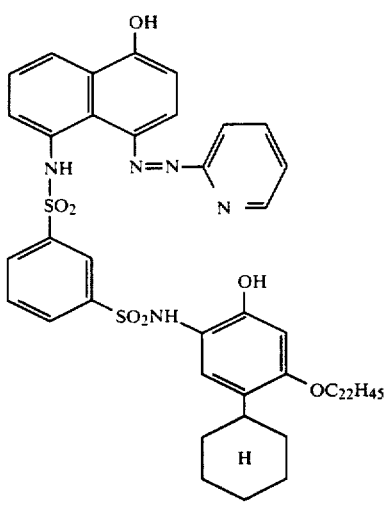

Compound 28

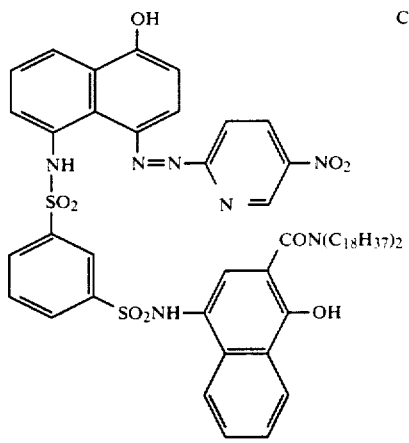

Compound 29

SYNTHESIS EXAMPLE 1

Synthesis of Compound 1

(1) Synthesis of 2-(4-Hydroxy-8-methanesulfonamidonaphthylazo)-6-sulfobenzothiazole To 5 ml of sulfuric acid was added 0.75 g of sodium nitrite and the mixture was stirred for 30 minutes at 70° C. After adding thereto 10 ml of a mixture of acetic acid and propionic acid (3:1) at a temperature below 15° C., 2.3 g of 2-amino-6-sulfobenzothiazole was added to the mixture at a temperature below 5° C. and the resultant mixture was stirred for 3 hours at 5° C. to provide a diazo solution.

In 30 ml of methyl cellosolve was dissolved 2.3 g of 5-methanesulfonamido-1-naphthol and after adding thereto 17 g of sodium acetate and 10 ml of acetic acid, the mixture was cooled to 0° C. To the mixture was added the diazo solution prepared in the above step at a temperature below 10° C. and after stirring the mixture for one hour at a temperature below 10° C., 60 ml of an aqueous hydrochloric acid solution (containing 10 ml of 35% hydrochloric acid) was added to the mixture. Crystals thus precipitated were collected by filtration and dried for 4 hours at 80° C. to provide 4.5 g of the desired material.

(2) Synthesis of 6-Chlorosulfonyl-2-(4-hydroxy-8-methanesulfonamidonaphthylazo)benzothiazole:

After stirring a mixture of 5 g of the compound prepared in above step (1), 50 ml of sulforan, 5 ml of phosphorus oxychloride and 1 ml of N,N-dimethylacetamide for one hour at 75° C., 300 ml of ice-water was added to the mixture. Crystals thus precipitated were collected by filtration, washed with water, and then vacuum-dried for 5 hours at 40° C. to provide 4.0 g of the desired material.

(3) Synthesis of Compound 1

While stirring a mixture of 4.6 g of 2-amino-4-cyclohexyl-5-hexadecyloxyphenol hydrochloride, 30 ml of N,N-diacetamide, and 3.2 ml of pyridine at room temperature, 4.3 g of the compound prepared in above step (2) was gradually added to the mixture followed by stirring for one hour. To the reaction mixture were added 50 ml of ethyl acetate and 100 ml of water. After recovering the ethyl acetate layer thus formed, the ethyl acetate solution was concentrated to dryness. The residue was purified by column chromatography using a mixed solvent of chloroform and ethyl acetate as a developing solvent to provide 2.3 g of the desired product.

SYNTHESIS EXAMPLE 2

Synthesis of Compound 12

While stirring a mixture of 6.4 g of 2-[5-amino-2-(2-methoxyethoxy)benzenesulfonamido]-4-cyclohexyl-5-hexadecyloxy-phenol, 30 ml of N,N-dimethylacetamide, and 2.4 ml of pyridine at room temperature, 5.8 g of 5-(3-chlorosulfonylbenzenesulfonamido)-4-(4-nitro-7-benzotriazolylazo)-1-naphthol was gradually added to the solution and thereafter the resultant mixture was stirred for one hour. Then, the mixture thus obtained was poured into 200 ml of an aqueous hydrochloric acid solution (containing 5 ml of 35% hydrochloric acid) and crystals thus precipitated were collected by filtration. After drying the crystals, they were purified by column chromatography using a mixed solvent of chloroform and ethyl acetate as a developing solvent to provide 5.1 g of the desired product.

SYNTHESIS EXAMPLE 3

Synthesis of Compound 25

While stirring a mixture of 4.4 g of 2-amino-4-tert-butyl-5-hexadecyloxyphenol hydrochloride, 30 ml of N,N-dimethylacetamide, and 3.2 ml of pyridine at room temperature, 5.5 g of 4-(2-benzoyloxy-5-chlorosulfonylphenylazo)-5-methanesulfonamido-1-naphthol was gradually added to the mixture and thereafter the resultant mixture was stirred for one hour. To the mixture was added 20 ml of a methanol solution of 2N potassium hydroxide under a nitrogen atmosphere and the mixture was stirred for one hour at 50° C. After adding thereto 5 ml of acetic acid, 50 ml of ethyl acetate and 100 ml of water was added to the mixture and the ethyl acetate layer thus formed was recovered, washed twice each time with water, and concentrated to dryness. The residue was purified by column chromatography using a mixed solvent of chloroform and ethyl acetate as a developing solution to provide 3.1 g of the desired product.

The azo dye or a precursor thereof released from the dye image-forming compound of this invention is a tridentate ligand or a guadridentate ligand forming a coordinated complex (chelate compound) with a polyvalent transition metal ion in an image-receiving layer. The metal ion may exist in the image-receiving layer or a layer adjacent to the image-receiving layer. Alternatively, after diffusing the dye into an image-receiving layer, the layer may be immersed in a metal ion bath or a viscous solution containing a metal ion may be brought into contact with the image-receiving layer containing the dye.

It is preferred that the transition metal ion to be incorporated in the image-receiving layer is substantially colorless when incorporated in the image-receiving layer and quickly forms a coordinated complex with the dye ligand diffused into the image-receiving layer. It is also preferred that the complex thus formed has good hue and is stable to light, heat, and chemicals. Furthermore, it is preferred that the metal ion be inert to a silver halide emulsion layer. Examples of such a metal ion are Cu(II), Ni(II), Pd(II), Pt(II), Co(II), Zn(II), etc., and Ni(II) and Cu(II) are particularly preferred.

It is preferred to use the metal ion in the form of a simple salt thereof, for example, the form of nickel acetate, nickel chloride, nickel sulfate, copper sulfate, lead acetate, etc.

The metal ion may also be used in the form of a metal complex together with a proper ligand, such as [Ni(II)-trinitroacetic acid] complex, [Ni(II)-ethylenediamine] complex, etc.

When incorporating the transition metal ion in an image-receiving layer or a layer adjacent to the image-receiving layer, a polymer capable of immobilizing the transition metal ion may be utilized. Examples of the polymer are the polymers shown by the following general formulae (i) to (iv).

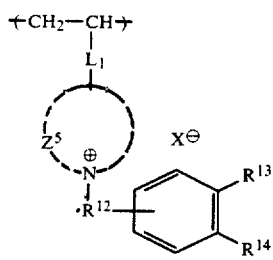   Formula (i)

wherein $L_1$ represents a single bond or a divalent bonding group; $Z^5$ represents an atomic group necessary for forming a heterocyclic ring nucleus which may have a substituent; $X^\ominus$ represents an anion; $R^{12}$ represents a single bond or an alkylene group; and $R^{13}$ and $R^{14}$ each represents an independent chelating group.

Practical examples of the heterocyclic nucleus formed by the atomic group shown by $Z^5$ are imidazole nucleus, a pyridine nucleus, a quinoline nucleus, an isoquinoline nucleus, a phenanthridine nucleus, a phenanthroline nucleus, a pyrimidine nucleus, a benzothiazole nucleus, a benzothiadiazole nucleus, a purine nucleus, a pyrazine nucleus, an acridine nucleus.

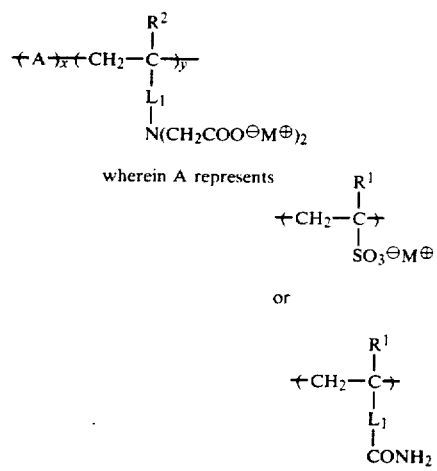   Formula (ii)

wherein $R^1$ and $R^2$, which may be the same or different, each represents a hydrogen atom, a halogen atom, or an alkyl group; $L_1$ has the same significance as defined in general formula (i); $M^\oplus$ represents $H^\oplus$, an ammonium ion, or an alkali metal ion; x represents 20 to 95% by weight; and y repesents 80 to 5% by weight.

Formula (iii):

The polymer of foregoing general formula (ii) having further $(B)_z$ wherein B represents a repeating unit capable of mordanting a transferred dye and z represents a value less than about 60% by weight.

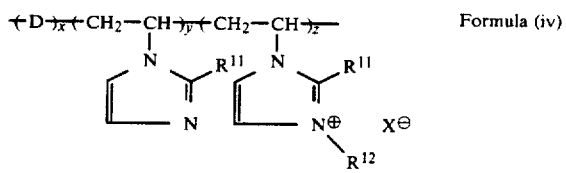   Formula (iv)

wherein D represents a group induced from an ethylenic unsaturated monomer; $R^{11}$ represents a hydrogen atom, an alkyl group, or an alkyl group substituted by a group coordinating to a metal or a salt thereof; $R^{12}$ represents an alkyl group or an aralkyl group; $X^\ominus$ has the same significance as defined in regard to general formula (i); x represents 10 to 80 mole%; y represents 10 to 80 mole%; and z represents 5 to 20 mole%.

As the polymers of immobilizing transition metal shown by these general formulae (i) to (iv), there are generally polymers having an iminodiacetic acid residue as a coordination group at the side chain as described in Japanese Patent Application (OPI) No. 48210/80, U.S. Pat. No. 4,193,796 and homopolymers of polyimidazole, copolymers thereof, and the partially quaternarized products thereof as described in U.S. Pat. Nos. 4,288,511, 4,273,853, and 4,282,305. Practical examples of these polymers are described in the foregoing patent specifications. Also, the polymers having the structure that a quaternarized latex is capsulated by the immobilizing polymer can be used and details of these polymers are described in U.S. Pat. No. 4,241,163.

Preferred examples of the transition metal-fixing polymers used in this invention are polyvinyl imidazole, poly(acrylamide-co-vinylbenzyliminodiacetic acid disodium salt), etc.

The image-receiving layer in this invention may further contain a mordant or a polymer mordant.

Examples of polymer mordants used in this invention include a polymer having a secondary or tertiary amino group, a polymer having a nitrogen-containing heterocyclic ring moiety, and a polymer having the quaternary cation group thereof. These polymers have a molecular weight of higher than 5,000, preferably higher than 10,000.

Examples of the polymer mordant used in this invention are the vinylpyridine polymers and vinylpyridinium cation polymers disclosed in U.S. Pat. Nos. 2,548,564, 2,484,430, 3,148,061 and 3,756,814; the vinylimidazolium cation polymers disclosed in U.S. Pat. No. 4,124,386; the polymer mordants cross-linkable with gelatin, etc., disclosed in U.S. Pat. Nos. 3,625,694, 3,859,096 and 4,128,538, British Pat. No. 1,277,453, etc.; the aqueous sol-type mordants disclosed in U.S. Pat. Nos. 3,958,995, 2,721,852, 2,798,063 and Japanese Patent Application (OPI) Nos. 115228/79, 145529/79, 126027/79, 155835/79, 17352/81, etc.; the water-insoluble mordants disclosed in U.S. Pat. No. 3,898,088, etc.; the reactive mordants capable of performing a covalent bond with dyes disclosed in U.S. Pat. Nos. 4,168,976, 4,201,840, etc.; as well as the mordants disclosed in U.S. Pat. Nos. 3,709,690, 3,788,855, 3,642,482, 3,488,706, 3,557,066, 3,271,147, 3,271,148, Japanese Patent Application (OPI) Nos. 30328/78, 155528/77, 125/78, 1024/78, 107835/78, British Pat. No. 2,064,802, etc.

Furthermore, the mordants described in U.S. Pat. Nos. 2,675,316 and 2,882,156 can be used in this invention.

The photosensitive silver halide emulsion used in this invention is a dispersion of silver chloride, silver bromide, silver chlorobromide, silver iodobromide, silver chloroiodobromide or a mixture thereof in a hydrophilic colloid. The halogen composition of the emulsion is selected according to the using purpose of the light-sensitive material and the processing condition for the light-sensitive material but silver bromide, silver iodobromide or silver chloroiodobromide having an iodide content of less than 10 mole% and a chloride content of less than 30 mole% is particularly preferred.

The silver halide emulsion used in this invention may be a negative type silver halide emulsion forming a surface latent image or a direct reversal type silver halide emulsion. As the latter type silver halide emulsion, there are an internal latent image type silver halide emulsion and a pre-fogged direct reversal type silver halide emulsion.

In the case of using the DRR compound in this invention any electron transferring agent which can cross-oxidizing the DRR compound can be used. Such an electron transferring agent can be also used as a developing agent and may be incorporated in an alkaline processing composition (processing element) or may be incorporated in a suitable layer of a light-sensitive element.

Examples of the electron transferring agent or a developing agent used in this invention are hydroquinones, aminophenols (e.g., N-methylaminophenol, etc.), pyrazolidones (e.g., 1-phenyl-3-pyrazolidone, 1-phenyl-4,4-dimethyl-3-pyrazolidone, 1-p-tolyl-4-hydroxymethyl-4-methyl-3-pyrazolidone, 1-p-tolyl-4,4-dihydroxymethyl-3-pyrazolidone, 1-phenyl-4-methyl-4-oxymethyl-3-pyrazolidone, etc.), phenylenediamines (e.g., N,N-diethyl-p-phenylenediamine, 3-methyl-N,N-diethyl-p-phenylenediamine, 3-methoxy-N-ethoxy-p-phenylenediamine, etc.), and the like.

Among the aforesaid materials, the black-and-white developing agents having a property of reducing the formation of stain in the mordant layer are particularly preferred.

Also, examples of the support used for the photographic materials of this invention are films used for ordinary photographic materials, such as cellulose acetate films, polystyrene films, polyethylene terephthalate films, polycarbonate films, etc. Other examples of the effective support are papers and papers laminated with a water-impermeable polymer such as polyethylene.

Then, the azo dye image-forming compounds of this invention will be explained hereinafter by exemplifying the foregoing DRR compounds but it will be understood that the following descriptions are also applicable to the case of other dye image-forming compounds.

There are no particular restrictions on the coating amount (or coverage) of the DRR compounds. An ordinary amount may be employed in this invention but the coating amount thereof is usually $1\times10^{-4}$ to $1\times10^{-2}$ mole/m$^2$, preferably $2\times10^{-4}$ to $2\times10^{-3}$ mole/m$^2$.

The DRR compound may be dispersed in a hydrophilic colloid by various manners according to the type of DRR compound. For example, when the DRR compound has a dissociable group such as a sulfo group and a carboxy group, the compound is dissolved in water or an alkaline aqueous solution and the resulting solution is dispersed in an aqueous solution of a hydrophilic colloid. On the other hand, when the compound does not easily dissolve in an aqueous medium and is easily soluble in an organic solvent, the compound can be dispersed by the following method:

(1) A method of dissolving the compound in a high-boiling solvent substantially insoluble in water and dispersing the solution of the compound in an aqueous hydrophilic colloid solution. This method is described in, for example, U.S. Pat. Nos. 2,322,027, 2,533,514 and 2,801,171. In this case, if desired, a low-boiling solvent or an organic solvent easily soluble in water may be used together with the foregoing high-boiling solvent and these solvents are removed by volatilization by drying or washing with water.

(2) A method of dissolving the compound in a water-miscible solvent and dispersing the solution in an aqueous hydrophilic colloid solution.

(3) A method of using an oleophilic polymer together with the high-boiling solvent in the foregoing method (1). This method is described in, for example, U.S. Pat. No. 3,619,195 and West German Pat. No. 1,957,467.

(4) A method of dissolving the compound in a water-miscible solvent and gradually adding an aqueous latex to the solution, thereby obtaining a dispersion containing the compound in latex particles. This method is described in, for example, Japanese Patent Application (OPI) No. 59943/76.

In another method, a hydrosol of an oleophilic polymer described in, for example, Japanese Patent Publication No. 39835/76 may be added to the dispersion of the compound in the hydrophilic colloid obtained by the foregoing method.

The dispersion of the DRR compound can be greatly accelerated by using a surface active agent as an emulsification aid. Useful surface active agents used for the purpose are described in the patent specifications indicated above and Japanese Patent Publication No. 4923/64 and U.S. Pat. No. 3,676,141.

Examples of the hydrophilic colloid used for dispersing the DRR compounds are gelatin; colloidal albumin; casein; cellulose derivatives such as carboxymethyl cellulose, hydroxyethyl cellulose, etc.; saccharose derivatives such as agar agar, sodium alginate, starch derivatives, etc.; and synthetic hydrophilic colloids such as polyvinyl alcohol, poly-N-vinyl pyrrolidone, polyacrylic acid copolymers, polyacrylamide and derivatives (e.g., partially hydrolyzed products) thereof, etc.

If desired, a mixture of two or more kinds of these colloids which are compatible with each other may be used. Among these materials, gelatin is most generally used and gelatin may be partially or wholly replaced with a synthetic hydrophilic colloid.

The DRR compound may be incorporated in a blue-sensitive silver halide emulsion layer, a green-sensitive silver halide emulsion layer, or a red-sensitive silver halide emulsion layer associated with (or in a so-called "complementary color relation" with) a hue (yellow, magenta or cyan) of a metal chelate compound formed by the metal ion in a light-sensitive material and a dye released from the DRR compound; or may be incorporated in other hydrophilic layer associated with the blue-sensitive, green-sensitive or red-sensitive silver halide emulsion layer.

When the photographic material of this invention is a photographic film unit, i.e., a film unit of the type that the film unit is processed by passing it through a pair of juxtaposed pressure-applying members, the photographic material is composed of the following elements:

(1) A light-sensitive element having a silver halide emulsion layer or layers associated with the DRR compound or compounds of this invention.

(2) An image-receiving element.

(3) A means of releasing an alkaline processing composition in the film unit, such as a rupturable container containing the alkaline processing composition. The composition may contain, if desired, a silver halide developing agent.

(4) At least one support.

In an embodiment of the photographic film unit, after image-exposing a light-sensitive material having formed on a support a single or plural silver halide emulsion layers, the light-sensitive material is superposed on an image-receiving element in a face-to-face relationship and an alkaline processing composition is spread between them to perform the development. Also, it is preferred that the film unit be light-shielded at both sides thereof when the film unit is withdrawn from a camera. In this case the image-receiving element may be peelded off after transferring the color image onto the image-receiving element or the transferred image in the image-receiving element may be viewed without peeling off the image-receiving element as described in U.S. Pat. No. 3,415,645.

In another embodiment of this invention, the support, the image-receiving element, and the light-sensitive element in the film unit are disposed in an integrated form. For example, a photographic film unit composed of a transparent support having coated thereon an image-receiving layer (containing the polymer mordant of this invention), a substantially opaque light-reflecting layer (e.g., a TiO$_2$ layer or a carbon black layer), and a single or plural photosensitive silver halide emulsion layers as disclosed in Belgian Pat. No. 757,960 is effective. In this embodiment, after exposing the photosensitive layer or layers, the photographic film unit is superposed on an opaque cover sheet in a face-to-face relationship and then a processing composition is spread between both elements.

Another embodiment of an integrated type of both elements, which can be employed in this invention, is also disclosed in Belgian Pat. No. 757,959. According to this embodiment, an image-receiving layer, a substantially opaque light-reflecting layer (e.g., the aforesaid layer), and a single or plural photosensitive layers are formed on a transparent support by coating and further a transparent cover sheet is superposed on the foregoing material in face-to-face relationship. A rupturable container containing an alkaline processing composition containing an opacifying agent (e.g., carbon black) is disposed adjacent to the uppermost layer of the foregoing light-sensitive layers and the transparent cover sheet. Such a film unit is exposed in a camera through the cover sheet and the rupturable container is ruptured by press-members when withdrawing the film from the camera to spread the processing composition (containing an opacifying agent) uniformly between the light-sensitive element and the cover sheet, whereby the film unit is shielded and the development proceeds.

In addition, the compounds of this invention shown by general formula (I) can also be used for the heat developable color photographic materials as described in European Patent Application No. 76492 A2.

REFERENCE EXAMPLE 1

Hue Test:

An image-receiving element was prepared as follows. That is, a gelatin solution containing nickel acetate was coated on a polyethylene terephthalate film support at a nickel acetate coverage of 0.35 g/m$^2$ and a gelatin coverage of 1.0 g/m$^2$; a mixture of polyvinyl imidazole and gelatin was coated thereon at a polyvinyl imidazole coverage of 3.0 g/m$^2$ and a gelatin coverage of 1.0 g/m$^2$; and then a gelatin solution was coated thereon at a gelatin coverage of 1.0 g/m$^2$.

Each of the Dyes 1 and 2 having the formulae shown below induced from the azo dye image-forming compounds of this invention and Comparison Dye A having the following formula outside the scope of this invention was dissolved in an aqueous 0.1N potassium hydroxide solution and a strip of the above-described image-receiving element was immersed in each solution, whereby the strip was dyed until the absorption coefficient became about 1. The strip was washed with water, immersed in a buffer of 2M acetic acid (pH adjusted to 6.0) for 20 minutes, and dried.

The absorption spectra of these film strips treated were measured and the absorption maximum and the half band width are shown in Table 1.

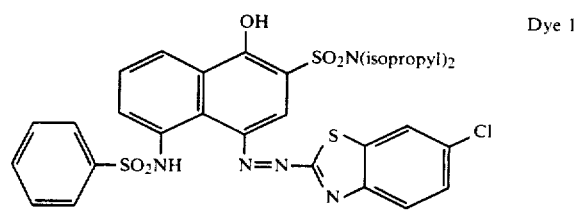

Dye 1

-continued

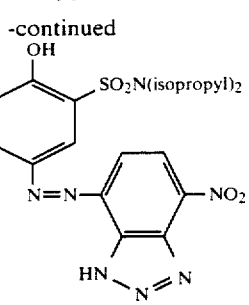
Dye 2

Comparison Dye A: (the dye released from Compound 21 disclosed in U.S. Pat. No. 4,142,891)

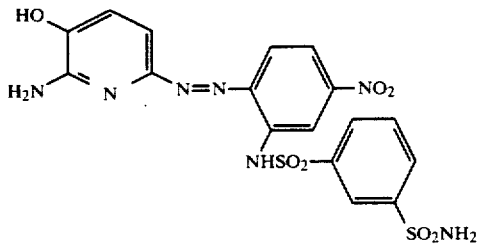

TABLE 1

| Dye | Transmission Absorption Maximum (nm) | Half Band Width (nm) |
| --- | --- | --- |
| 1 | 644 | 118 |
| 2 | 728 | 194 |
| A | 640 | 144 |

From the above results, it is understood that the Ni-complex of each dye of this invention has the absorption maximum at a longer wavelength side and shows good hue as compared to the comparison dye.

REFERENCE EXAMPLE 2

Light Resistance Test:

An image-receiving element [A] was prepared by coating a gelatin composition containing nickel acetate on a polyethylene phthalate film support at a nickel acetate coverage of 0.35 g/m² and a gelatin coverage of 1.0 g/m²; coating thereon a mixture of polyvinyl imidazole and gelatin at a polyvinyl imidazole coverage of 3.0 g/m² and gelatin coverage of 3.0 g/m²; coating thereon a gelatin solution containing TiO₂ at a TiO₂ coverage of 20 g/m² and a gelatin coverage of 3.0 g/m²; and coating thereon a gelatin solution at a gelatin coverage of 1.0 g/m².

Also, an image-receiving element [B] was prepared in the same way as above image receiving element [A] except that nickel acetate was not incorporated in the gelatin layer.

Each of Dyes 1 and 2 illustrated above was dissolved in each aqueous 0.1N potassium hydroxide solution and strips of image-receiving elements [A] and [B] were immersed in each solution and dyed until the absorption coefficient became about 1. Then, the strips were washed with water, immersed in a buffer of 0.02M acetic acid (pH adjusted to 6.0) for about 20 minutes, and dried.

The film strips thus obtained were exposed to light and the light resistance of the dye was measured in the following manner.

While covering half of each dyed strip with a light-shielding paper containing carbon black, the strip was exposed to a fluoroescent lamp of 17,000 lux for 14 days, then, the reflection density was measured at the unexposed portion and the exposed portion (unexposed portion: Do, exposed portion: D), and the value of D/Do × 100 obtained as survival (%) is shown in Table 2.

TABLE 2

| Dye | Image-Receiving Element | D/Do × 100 (%) |
| --- | --- | --- |
| 1 | [A] (Ni used) | 97 |
|   | [B] (no Ni) | 57 |
| 2 | [A] (Ni used) | 93 |
|   | [B] (no Ni) | 80 |

From the above results, it is understood that the Ni complexes of the dyes of this invention have very good light resistance.

REFERENCE EXAMPLE 3

Chelating Rate Test:

Each of the foregoing Dyes 1 and 2 of this invention and Comparison Dye A was dissolved in a buffer of 0.1% acetic acid (a mixed solvent of 2-methoxy ethanol and water at 80:20) having an adjusted pH of 7.0 so that the concentration of the dye became $6.0 \times 10^{-5}$M to provide Solution I for each. Also, nickel acetate was dissolved in a buffer of 10% triethanolamine (a mixed solvent of 2-methoxy ethanol and water at 80:20) having an adjusted pH of 10.0 so that the concentration became $6.0 \times 10^{-3}$M to provide Solution II.

Solution I was mixed with Solution II by means of a high-speed reaction measurement apparatus, and the pseudo-first-order reaction rate constant (25° C.) of the chelating rate of each of Dyes 1 and 2 and Comparison Dye A with the nickel ion was measured. The results are shown in Table 3.

TABLE 3

| Dye | Chelating Rate $(s^{-1})$ |
| --- | --- |
| 1 | 2.40 |
| 2 | 17.45 |
| A | 0.15 |

From the above results, it is understood that each of the dyes of this invention forms a complex with nickel ions very fast.

EXAMPLE 1

Hue Test (light-sensitive material):

A light-sensitive material A was prepared by coating, in succession, the following layers on a polyethylene terephthalate support. (The numeral value in the parenthesis is a coverage or coated amount (g/m²) of the material.)

(1) A mordant layer containing gelatin (3.0), nickel acetate (0.35), and poly(divinylbenzene-costyrene-co-N-methyl-N-vinylbenzylpiperidinium chloride) (5:47.5:47.5 by weight ratio) (3.0).

(2) A metal fixing layer containing gelatin (1.15) and poly(acrylamide-co-sodium N-vinylbenzyliminodiacetate) (80:20 by weight ratio) (1.60).

(3) A white reflection layer containing gelatin (3.0) and titanium dioxide (20).

(4) A black light-shield layer containing gelatin (0.75) and carbon black (1.5).

(5) A cyan dye layer containing the azo dye image-forming compound (foregoing Compound No. 6 of this invention) (0.5) and gelatin (1.1).

(6) A red-sensitive photosensitive silver halide emulsion layer containing a red-sensitive internal latent image-type silver halide emulsion (2.0), gelatin (2.0), 2-methyl-3-(2-formylethyl)benzothiazolium bromide (0.022), and 5-octadecylhydroquinone-2-sulfonic acid (0.12).

(7) A layer containing gelatin (2.6) and 2,5-di-t-pentadecylhydroquinone (0.8).

(8) An overcoat layer containing gelatin (2.0).

Also, as a comparison sample, a light-sensitive material B was prepared by the same way as light-sensitive material A except that the compound having the following structure (Compound No. 21 described in U.S. Pat. No. 4,142,891) was used in place of the dye image-forming compound (Compound No. 6).

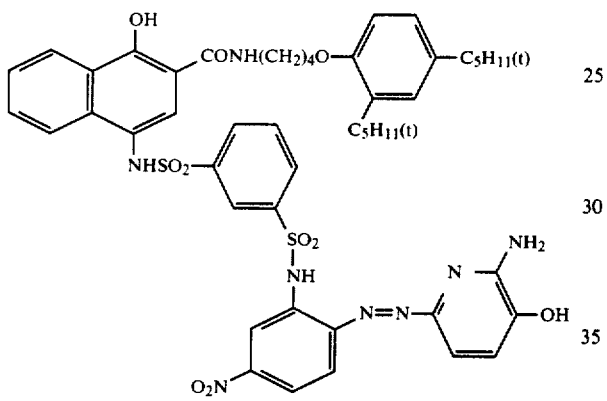

Each sample was uniformly exposed to light so as that the reflection density at the image-receiving layer (mordant layer) side became about 1.0 after processing each of the light-sensitive materials A and B, and superposed on the following cover sheet. A processing liquid having the following composition was spread therebetween. After 30 minutes, the reflection spectrum at the image-receiving layer side was measured by means of a spectrophotometer.

Cover Sheet:

A polyethylene terephthalate film support having the following layers:

(1) a neutralization layer containing polyacrylic acid, and (2) a timing layer composed of a mixture of cellulose acetate and poly(styrene-co-maleic anhydride).

Processing Composition:

| | |
|---|---|
| Potassium Hydroxide (28%) | 71 g |
| Sodium Sulfite | 2.0 g |
| 5-Methylbenzotriazole | 3.0 g |
| 4-Hydroxymethyl-4-methyl-1-phenyl-3-pyrazolidone | 5.0 g |
| Potassium Bromide | 20 g |

The absorption maximum and the half band width obtained are shown in Table 4.

TABLE 4

| Dye Image-Forming Compound | Chelate Compound of Azo Dye | |
|---|---|---|
| | Reflection Absorption Maximum (nm) | Half Band Width (nm) |
| 6 | 657 | 124 |
| Comparison Compound | 581 | 216 |

From the above results, it is understood that the chelate compound of the azo dye of this invention has the absorption maximum at a longer wavelength side as compared to the chelate compound of the comparison compound and also shows good hue since the half band width of the chelate compound is narrow.

While the invention has been described in detail and with reference to specific embodiments thereof, it will be apparent to one skilled in the art that various changes and modifications can be made therein without departing from the spirit and scope thereof.

What is claimed is:

1. A color photographic material, comprising:
   a support base having thereon:
   a photosensitive silver halide emulsion layer; and
   a compound associated with the emulsion layer, the compound being represented by general formula (I)

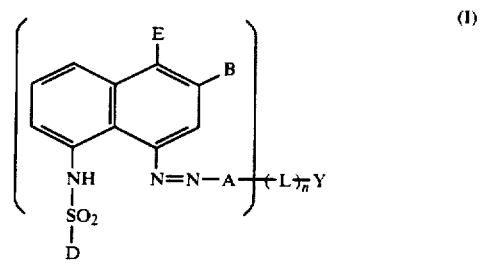

wherein

A represents an aromatic carbon ring nucleus represented by the formula (IV):

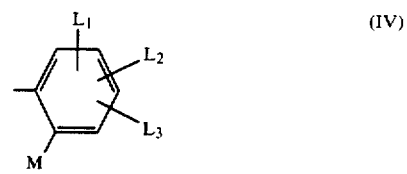

wherein $L_1$, $L_2$, and $L_3$ each represents a hydrogen atom, a halogen atom, a nitro group, a cyano group, an alkyl group, a substituted alkyl group, an alkoxy group, a substituted alkoxy group, $-NHCOR^2$, $-NHSO_2R^2-$, $-SO_2R^2-$, $-COR^2$,

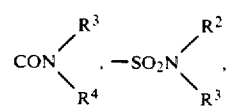

or an amino group and M is a unidentate or bidentate coordination chelating group selected from the group consisting of a hydroxy group or a salt thereof, a precursor of a hydroxy group and a sulfonamide group, or A represents a heterocyclic ring nucleus having a unidentate or bidentate chelate-forming group, at least one ring of which is composed of 5 or 6 atoms; B represents a hydrogen atom, a sulfo group, a cyano group, a fluorosulfonyl group, a halogen atom, an —SO$_3$-phenyl group, an —SO$_3$-substituted phenyl group, a carboxy group, and —SOR$^1$ group, an SO$_2$R$^2$ group, a —COR$^2$ group, a group shown by

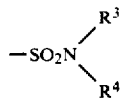

or a group shown by

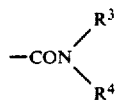

D represents an alkyl group, a substituted alkyl group, an aralkyl group, a substituted aralkyl group, a phenyl group, a substituted phenyl group, an amino group (which may be substituted by an alkyl group), or a heterocyclic ring composed of 5 or 6 atoms; E represents a hydroxy group, a salt thereof, or a precursor forming a hydroxy group or a salt thereof; L represents a bond bonding Y to D, A or B; n represents 1 or 0; and Y represents a moiety having a function of releasing a diffusible azo dye compound capable of forming metal chelate compounds or a precursor thereof from the compound of general formula (I) by the decomposition thereof as the result of a redox reaction; and wherein R$^1$ represents an alkyl group or a substituted alkyl group; R$^2$ represents an alkyl group, a substituted alkyl group, an aralkyl group, a substituted aralkyl group, a phenyl group or a substituted phenyl group; and R$^3$ and R$^4$, which may be the same or different, each represents a hydrogen atom, an alkyl group, a substituted alkyl group, an aralkyl group, a substituted aralkyl group, a phenyl group, or a substituted phenyl group.

2. A color photographic material as claimed in claim 1, wherein A is represented by a general formula selected from the group consisting of (II), (III), (IV) and (V):

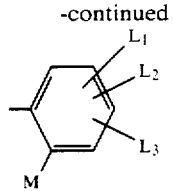 (II)

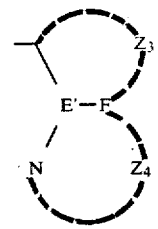 (III)

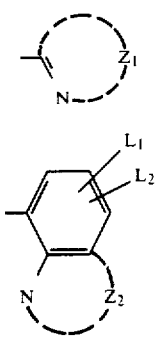

(IV)

(V)

wherein $Z_1$, $Z_2$, $Z_3$ and $Z_4$, each represents a non-metallic atomic group necessary for forming a nitrogen-containing heterocyclic ring; $L_1$, $L_2$, and $L_3$, each represents a hydrogen atom, a halogen atom, a nitro group, a cyano group, an alkyl group, a substituted alkyl group, an alkoxy group, a substituted alkoxy group, —NHCOR$^2$, —NHSO$_2$R$^2$, —SO$_2$R$^2$, —COR$^2$,

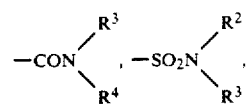

or an amino group (where R$^2$, R$^3$ and R$^4$ have the same significance as defined in claim 1); M has the same significance as defined in claim 1; and E' and F independently represent a carbon atom or a nitrogen atom.

3. A color photographic material as claimed in claim 2, wherein A is a heterocyclic ring represented by the general formula (II), and the nitrogen-containing heterocyclic ring formed by $Z_1$ is selected from the group consisting of a pyridine, a benzothiazole, a thiazole, an indazole, a pyrazolotriazole, a benzimidazole, an imidazole, a thiodiazole, a pyrazole, and a triazole.

4. A color photographic material as claimed in claim 2, wherein A is a heterocyclic ring represented by general formula (III) and the nitrogen-containing heterocyclic ring formed by $Z_2$, a nitrogen atom and a benzene ring is selected from the group consisting of a benzotriazole, an indazole, a benzothiadazole, a benzimidazole, an indoline and indole.

5. A color photographic material as claimed in claim 2, wherein A is an aromatic carbon ring represented by general (IV) and M is a unidentate or bidentate coordination chelating group selected from the group consisting of a hydroxy group or a salt thereof, a precursor of a hydroxy group and a sulfonamide group.

6. A color photographic material as claimed in claim 2, wherein A is a heterocyclic ring represented by the general formula (V) and the condensed heterocyclic ring formed by E', F, $Z_3$ and $Z_4$ are selected from the group consisting of an imidazopyridine, a pyrazolotriazole, and an imidazotriazine.

7. A color photographic material as claimed in claim 1, wherein the compound of general formula (I) is a non-diffusible redox compound capable of releasing an image-wise diffusible dye upon development (DRR compound).

8. A color photographic material as claimed in claim 7, wherein a coating amount of the DRR compound is $1 \times 10^{-4}$ to $1 \times 10^{-2}$ mole/m$^2$.

9. A color photographic material as claimed in claim 1, wherein B of general formula (I) is a hydrogen atom, a cyano group, a halogen atom, an —SO$_2$R$^2$ group (wherein R$^2$ represents an alkyl group having 1 to 3 carbon atoms, a benzyl group, or a phenyl group), a group shown by

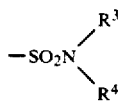

(wherein R$^3$ and R$^4$, which may be the same or different, each represents a hydrogen atom, an alkyl group having 1 to 4 carbon atoms, a substituted alkyl group having 1 to 4 carbon atoms, a phenyl group, a substituted phenyl group, or a group shown by

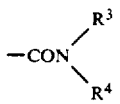

(wherein R$^3$ and R$^4$ have the same significance as defined above).

10. A color photographic material as claimed in claim 1, wherein D of general formula (I) represents an alkyl group having 1 to 4 carbon atoms, a substituted alkyl group having 1 to 4 carbon atoms, a phenyl group, a substituted phenyl group, or an amino group.

11. A color photographic material as claimed in claim 1, wherein E of general formula (I) represents a hydroxy group, a salt thereon, or a precursor of a hydroxy group.

12. A color photographic material as claimed in claim 1, wherein L of general formula (I) is shown by

wherein J represents —CO—, —SO$_2$—,

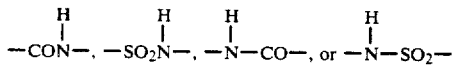

and X represents an alkylene group having 1 to 3 carbon atoms, a phenylene group, or a substituted phenylene group.

13. A color photographic material as claimed in claim 3, wherein A is a heterocyclic ring represented by the general formula (II), and the nitrogen-containing heterocyclic ring formed by Z$_1$ is selected from the group consisting of a pyridine, a benzothiazole, a thiazole, an indazole, a pyrazolotriazole, an imidazole, a pyrazole, and a triazole.

14. A color photographic material as claimed in claim 4, wherein A is a heterocyclic ring represented by the general formula (III) and the nitrogen-containing heterocyclic ring formed by Z$_2$, a nitrogen atom and a benzene ring is selected from the group consisting of a benzotriazole, an indazole, and a benzimidazole.

15. A color photographic material as claimed in claim 5, wherein A is an aromatic carbon ring represented by the general formula (IV) and M is selected from the group consisting of a hydroxy group or a salt thereof, —NHSO$_2$CH$_3$, or

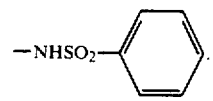

16. A color photographic material as claimed in claim 6, wherein A is a heterocyclic ring represented by the general formula (V) and the condensed heterocyclic ring formed by E', F, Z$_3$ and Z$_4$ are selected from the group consisting of an imidazopyridine and a pyrazolotriazole.

17. A color photographic material as claimed in claim 9, wherein B of the general formula (I) is a hydrogen atom, a cyano group, a chlorine atom, an —SO$_2$CH$_3$ group, a group shown by

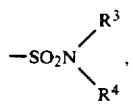

or a group shown by

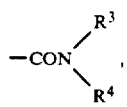

where R$^3$ and R$^4$, which may be the same or different, each represents a hydrogen atom, an alkyl group having 1 to 4 carbon atoms, a —CH$_2$CH$_2$OCH$_3$ group, a —CH$_2$CH$_2$OH group, a phenyl group, or a substituted phenyl group.

18. A color photographic material as claimed in claim 10, wherein D of the general formula (I) is a methyl group, an amino group, a phenyl group, or a substituted phenyl group.

19. A color photographic material as claimed in claim 11, wherein E of the general formula (I) is a hydroxy group or a salt thereof.

20. A color photographic material as claimed in claim 12, wherein L of the general formula (I) is a group shown by —J—X— combining D or A with Y, wherein J represents —CO—, —SO$_2$—,

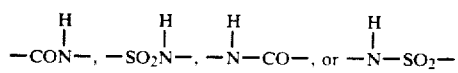

and X represents a phenylene group or a substituted phenylene group.

* * * * *